(12) United States Patent
Johnson (10) Patent No.: US 8,888,163 B1
(45) Date of Patent: Nov. 18, 2014

(54) UTILITY VEHICLE SCREEN

(71) Applicant: J. Michael Johnson, Dublin, TX (US)

(72) Inventor: J. Michael Johnson, Dublin, TX (US)

( * ) Notice: Subject to any disclaimer, the term of this patent is extended or adjusted under 35 U.S.C. 154(b) by 0 days.

(21) Appl. No.: 13/923,504

(22) Filed: Jun. 21, 2013

(51) Int. Cl.
*B60N 99/00* (2006.01)
*B60J 1/02* (2006.01)

(52) U.S. Cl.
CPC .................................. *B60J 1/02* (2013.01)
USPC ........................... 296/84.1; 296/77.1

(58) Field of Classification Search
CPC ............... B60J 1/02; B60J 1/04; B62J 17/04
USPC ............... 296/84.1, 90, 96.21, 77.1, 79, 80, 296/180.1; 160/239, 268.1, 269, 327, 382, 160/377, DIG. 2
See application file for complete search history.

(56) References Cited

U.S. PATENT DOCUMENTS

| | | | |
|---|---|---|---|
| 4,813,706 A * | 3/1989 | Kincheloe | 280/756 |
| 5,174,622 A * | 12/1992 | Gutta | 296/77.1 |
| 5,460,409 A * | 10/1995 | Conner | 280/749 |
| 6,973,953 B2 | 12/2005 | Winner | |
| 7,007,999 B1 | 3/2006 | Schneller | |
| 7,147,263 B2 | 12/2006 | Schneidau et al. | |
| 7,311,347 B1 * | 12/2007 | Aller | 296/77.1 |
| 2002/0084669 A1 * | 7/2002 | Goodstein | 296/77.1 |
| 2009/0021051 A1 | 1/2009 | Brown | |
| 2011/0241325 A1 * | 10/2011 | King et al. | 280/756 |

* cited by examiner

*Primary Examiner* — Lori L Lyjak
(74) *Attorney, Agent, or Firm* — Law Office of Sam Sokhansanj, PLLC; Sam Sokhansanj (57) ABSTRACT

A removable and re-attachable screen for a utility vehicle (UTV) for providing protection from debris to a driver and passenger while allowing airflow into the cab area. The screen includes a frame made of flexible material and a meshed flexible screen secured to the frame. The frame has a plurality of securement devices for securing the frame to a roll cage of a utility vehicle. Further, the securement devices are secured to at least a front top bar of the roll cage and at least two side bars of the roll cage. The screen can be further made of fiberglass material, thereby providing durable and long lasting protection.

17 Claims, 7 Drawing Sheets

UTILITY VEHICLE SCREEN

FIELD OF THE INVENTION

The present invention is related to a windscreen for a utility vehicle (UTV).

BACKGROUND

Utility vehicles (UTVs) are becoming increasingly popular for use in various settings. Generally, a UTV comprises a body, a cab area where the driver is seated, and a roll cage that surrounds the cab area. One of the problems with conventional UTVs is that they do not protect the driver and passengers from debris, such as bugs, rocks, branches, dust, dirt, etc.

Cab enclosures and lightweight transparent windshields have been developed that can be attached to a roll cage to protect the driver and passengers. These devices are typically comprised of a transparent plastic material that is non-permeable. However, these transparent devices reduce the passage of air into the cab area. Reduced airflow into the cab area, dust and debris is more prone to collect within the cab area. In addition, during warm and hot weather conditions, reduced airflow into the cab area can be uncomfortable for the driver and passengers.

While UTVs are suitable for the particular purpose to which they address, they are not as suitable for providing protection from debris to a driver while allowing airflow into the cab area. Conventional UTVs do not provide adequate protection for drivers and passengers.

U.S. Pat. No. 7,007,999 (Schneller) discloses a flexible windscreen for attaching to a front portion of a roll cage of a utility vehicle. However, a disadvantage of this windscreen is that it requires separate additional components, namely, a plurality of separate brackets to be mounted to the roll cage of the vehicle. Further, the windscreen is mounted to the brackets using separate additional fasteners, such as bolts and nuts. Hence, the Schneller patent necessitates additional components and tools for mounting the windscreen and does not provide a quick and simple way to remove and re-attach the windscreen.

In view of the above problems, the present invention overcomes the shortfalls of the prior art by providing a screen that is easily mountable to a front portion of a UTV, securely mountable to the UTV, easily removable and re-attachable, more durable from breakage, cost effective to manufacture, simple in design, and can be easily folded and stored when not in use.

SUMMARY OF THE INVENTION

The present invention overcomes the disadvantages and limitations of the prior art by providing a utility vehicle screen that can be mounted to a roll cage or front portion of a UTV or suitable vehicle. The screen can be easily attached and removed using multiple straps that are integrated with the screen. In addition, the screen can be made of a virtually indestructible fiberglass material. When the screen is not needed, a user can unhook or unwind the straps and easily remove it. Further, the screen can be folded multiple times and easily stowed away, such as placing it inside the glove compartment, in a bag, under or behind the seat, etc. In addition, the screen of the present invention, in one aspect thereof, does not require additional tools or separate components in order to mount it to the UTV.

In one aspect of the invention, a utility vehicle screen is provided having a frame made of flexible material. Further, a meshed flexible screen is then secured to the frame. The frame has a plurality of securement devices for securing the frame to a roll cage of the utility vehicle.

In another aspect of the invention, a windscreen for a vehicle is provided having a frame made of flexible material. Further, a meshed flexible screen secured to the frame. The frame has a plurality of securement devices for securing the frame to an A-pillar of the vehicle. In addition, the securement devices are comprised of a plurality of straps.

The above summary is not intended to describe each and every disclosed embodiment or every implementation of the disclosure. The Description that follows more particularly exemplifies the various illustrative embodiments.

BRIEF DESCRIPTION OF THE DRAWINGS

Various other objects, aspects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
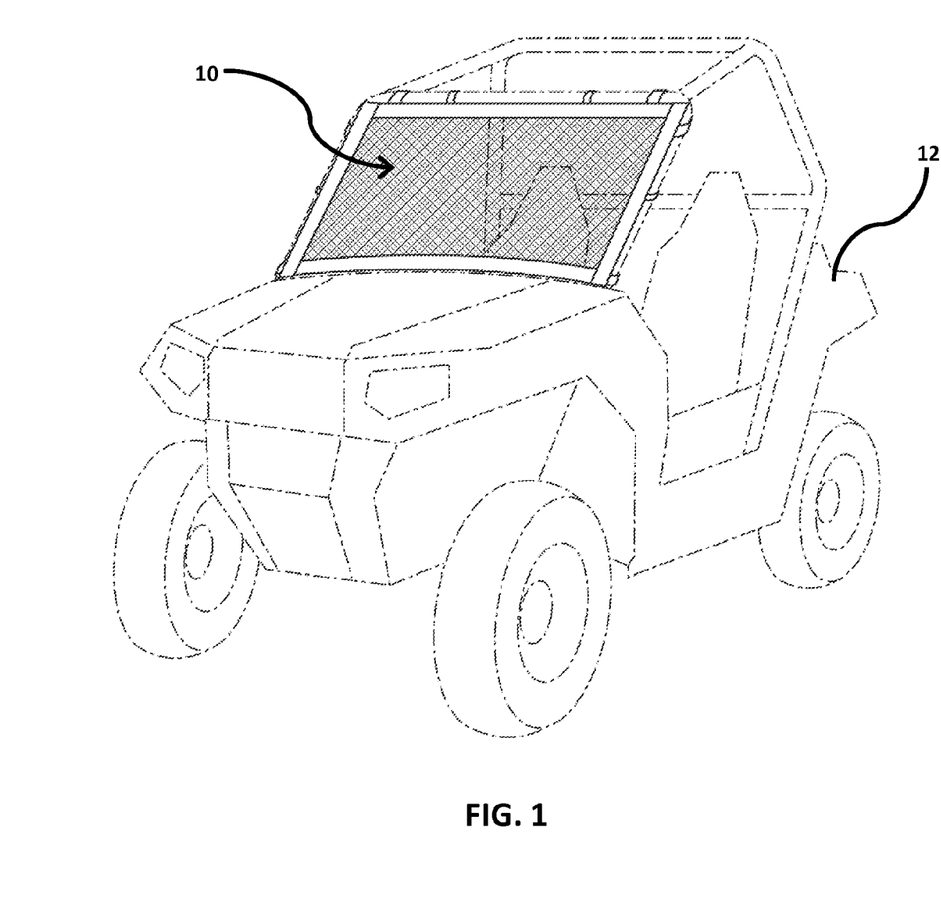
FIG. 1 illustrates a perspective view of a windscreen of the present invention as mounted to a UTV, as viewed from the exterior of the UTV.

FIG. 1 illustrates one embodiment of the screen 10 of the present invention as mounted to a UTV 12. However, it is contemplated within the scope of the invention that the screen of the present invention can be mounted to any type of vehicle, including but not limited to an all terrain vehicle (ATV), motorcycle, three-wheeler, golf cart, dune buggy, and the like.

Figure 2:
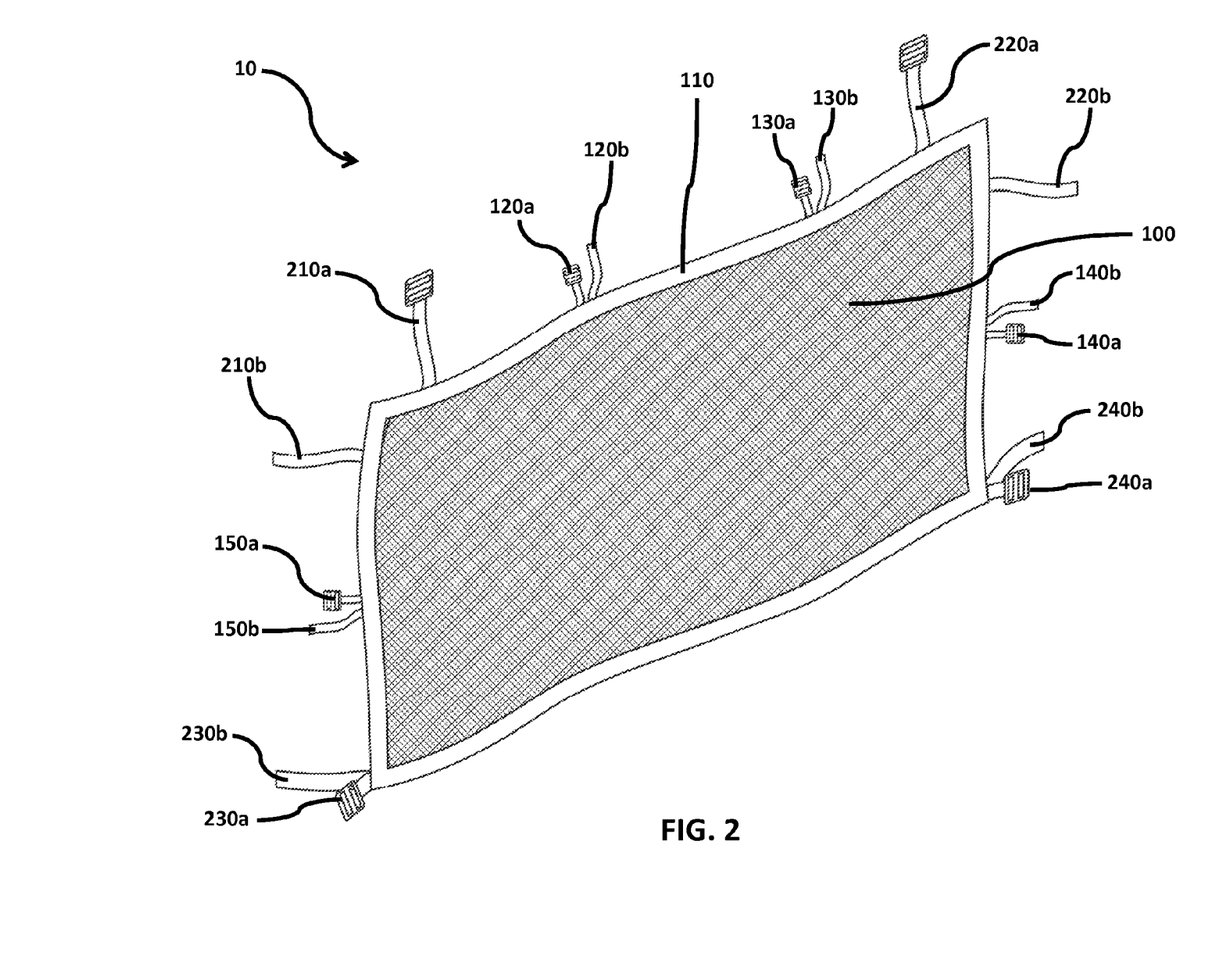
FIG. 2 illustrates an exploded perspective view of one embodiment of the windscreen illustrating its integrated straps and fasteners.

FIG. 2 illustrates screen of FIG. 1 in an exploded view, illustrating a plurality of straps and fasteners. Here, windscreen 10 includes meshed screen 100 securely mounted to flexible frame or border 110. In the current embodiment, screen 100 is made of fiberglass material with a mesh count of approximately 20×20, approximately thickness of 0.011, yard diameter of 0.008-0.0085, and approximately 75% light transmission, and is flame retardant, such as the mesh screen known as BetterVue® from the manufacturer Phifer®. However, it is contemplated within the scope of the invention that screen 100 can include, but is not limited to aluminum, various fabrics, wire mesh material, mesh size, light transmission ratio, coloar, plastic, polycarbonate, cotton, polyester, and the like. In the current embodiment, windscreen 10 is approximately 54 in.×34 in, however, it is contemplated within the scope of the invention that the windscreen can be any size, shape, and/or configured to the size of the UTV or vehicle specifications for which it is being mounted. In other embodiments, the windscreen of the present invention can be a universal one-size windscreen, having extended straps and fasteners, thereby accommodating and/or retrofitting all or most types of UTVs. Further, frame or border 110 is made of a flexible and foldable material, such as vinyl or cotton. However, it is contemplated within the scope of the invention that the frame or border can be made of any suitable material, such as plastic, metal, fiberglass, and/or polymer derived. When the screen is not in use, it can be easily folded into one or more folds and stowed away.

Figure 3:
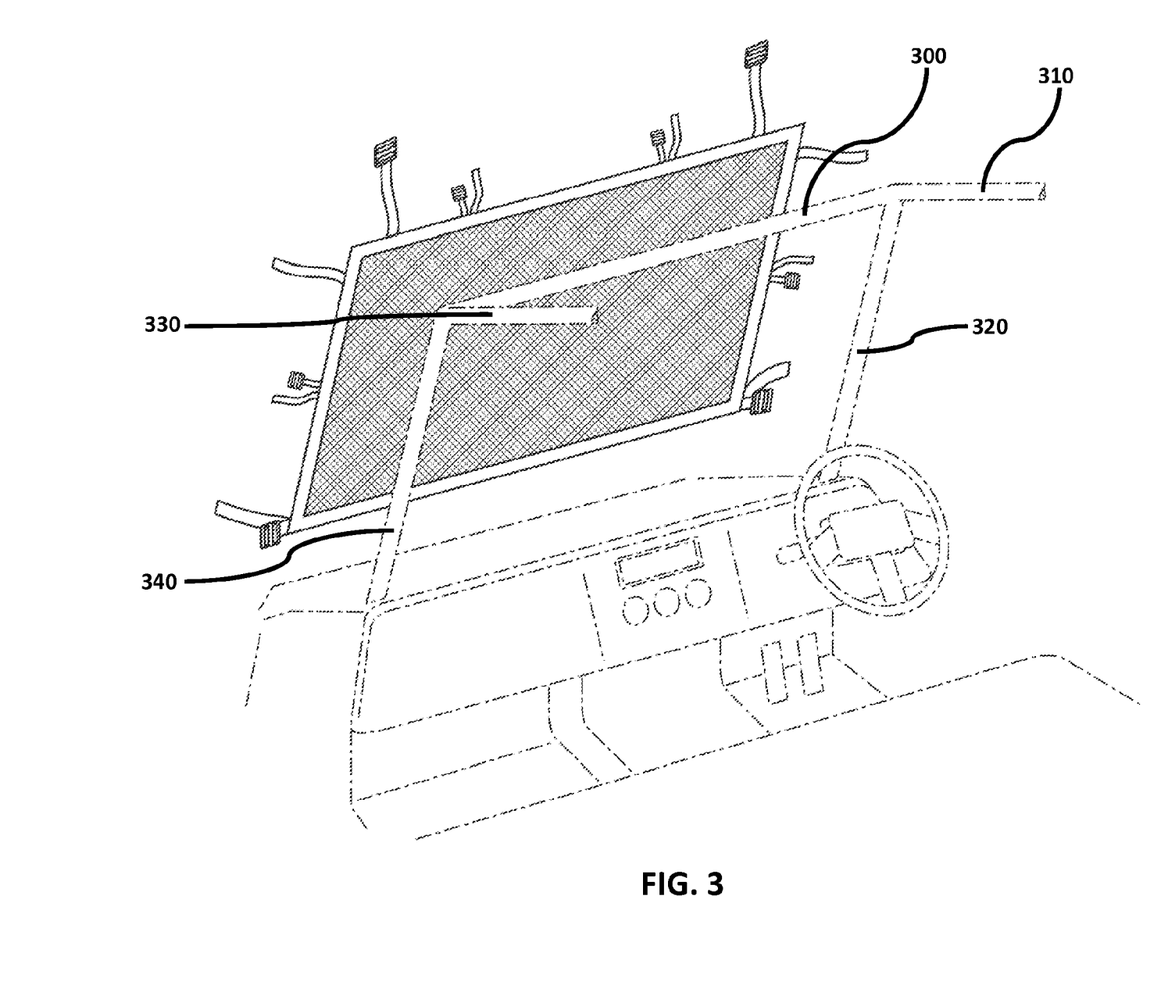
FIG. 3 illustrates a perspective view of the windscreen of FIG. 2 prior to being mounted to the roll cage of the UTV, as viewed from the cockpit area of the UTV.
Figure 4:
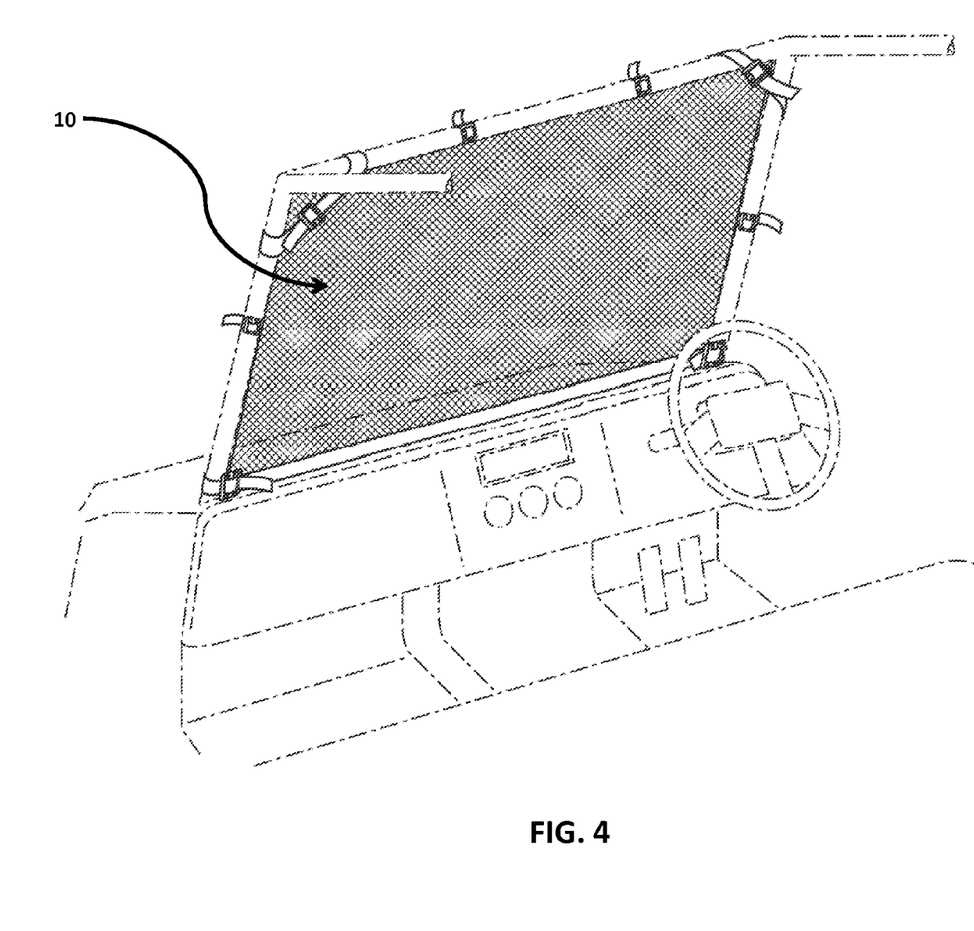
FIG. 4 illustrates a perspective view of the windscreen of FIG. 2 as mounted to the roll cage of the UTV, as viewed from the cockpit area of the UTV.

Referring to FIGS. 2-4, which illustrate one embodiment of the present invention, windscreen 10 has a plurality of straps securely attached to border or frame 110. In this embodiment, the straps are securely stitched to and integrated with the screen. However, it is contemplated within the scope of the invention that the straps may be detached (not initially integrated) and attached to the border using various securing methods, such as with snaps, buttons, adhesives, rivets, nut and bolt, nails, and/or staples. Here, straps 120*a*, 120*b*, 130*a*, and 130*b* engage and secure the windscreen to a top bar or beam of the roll cage of a UTV or any suitable vehicle. Straps 210*a*, 210*b*, 220*a*, and 220*b* engage and secure the windscreen to the top corners of the roll cage of a UTV. Straps 150*a*, 150*b*, 230*a*, 230*b*, 140*a*, 140*b*, 240*a*, and 240*b* engage and secure the windscreen to the side upstanding bars or beams of the UTV. Specifically, straps 120*a*, 130*a*, 140*a*, 150*a*, 210*a*, 220*a*, 230*a*, and 240*a* (straps designated with an "a") have a tri-glide or H type buckle connected at their ends thereto that engage straps 120*b*, 130*b*, 140*b*, 150*b*, 210*b*, 220*b*, 230*b*, and 240*b* (straps designated with a "b"), respectively. However, it is contemplated within the scope of the invention that the connectors on straps 120*a*-240*a* can also be included on straps 120*b*-240*b* in addition to or in lieu of. Further, it is contemplated within the scope of the invention that any type of strap, connector, buckle, or strap connecter can be used for either one or more of straps 120*a*-240*a* and 120*b*-240*b*, including but not limited to a "D" buckle, side release buckle, clip buckle, hook and loop (Velcro®), snap buckle, tang buckle, clamp buckle, cam and spring buckles, carabiners, footman loops, spring pins, hooks, mini carabiner, ratchet buckles, and/or snap hooks. Further, either one or more of straps 120*a*-240*a* and/or their connectors and straps 120*b*-240*b* and/or their connectors can be made of any material, such as cotton, polyester, nylon, plastic, metal, aluminum, fiberglass, rubber, vinyl, and/or polymer based.

FIGS. 2-4 illustrate the method of attaching windscreen 10 to the UTV. In the current embodiment, the windscreen is attached from the exterior of the UTV, but in other embodiments, it can be attached from the interior or cabin of the UTV. Further, It is contemplated within the scope of the invention that a user is not limited to the following order and method of assembly. Here, straps 230*a*, 230*b*, 150*a*, and 150*b* are at least partially wrapped around side bar 340 and are securely tightened around the bar. Likewise, straps 140*a*, 140*b*, 240*a*, and 240*b* are at least partially wrapped around side bar 320 and are securely tightened around the bar. Further, straps 420*a*, 420*b*, 430*a*, and 430*b* are at least partially wrapped around the overhead or top bar 300. Here, strap 210*b* is at least partially wrapped around side bar 340 and strap 210*a* is at least partially wrapped around top bar 300 where it engages strap 210*b* and is securely tightened to strap 210*a*. Likewise, strap 220*b* is at least partially wrapped around side bar 320 and strap 220*a* is at least partially wrapped around top bar 300 where it engages strap 220*b* and is securely tightened to strap 220*a*.

After the windscreen 10 has been attached to the roll cage or front windshield area of the UTV or any suitable vehicle, the user may then adjust any of the straps by either loosening or tightening the straps as they see fit in order to remove any slack, ripples, or deviations on the surface of the windscreen, thereby having a windscreen that is taught and securely mounted to the UTV. FIG. 4 illustrates the windscreen 10 of the current embodiment in final assembled form.

Figure 5:
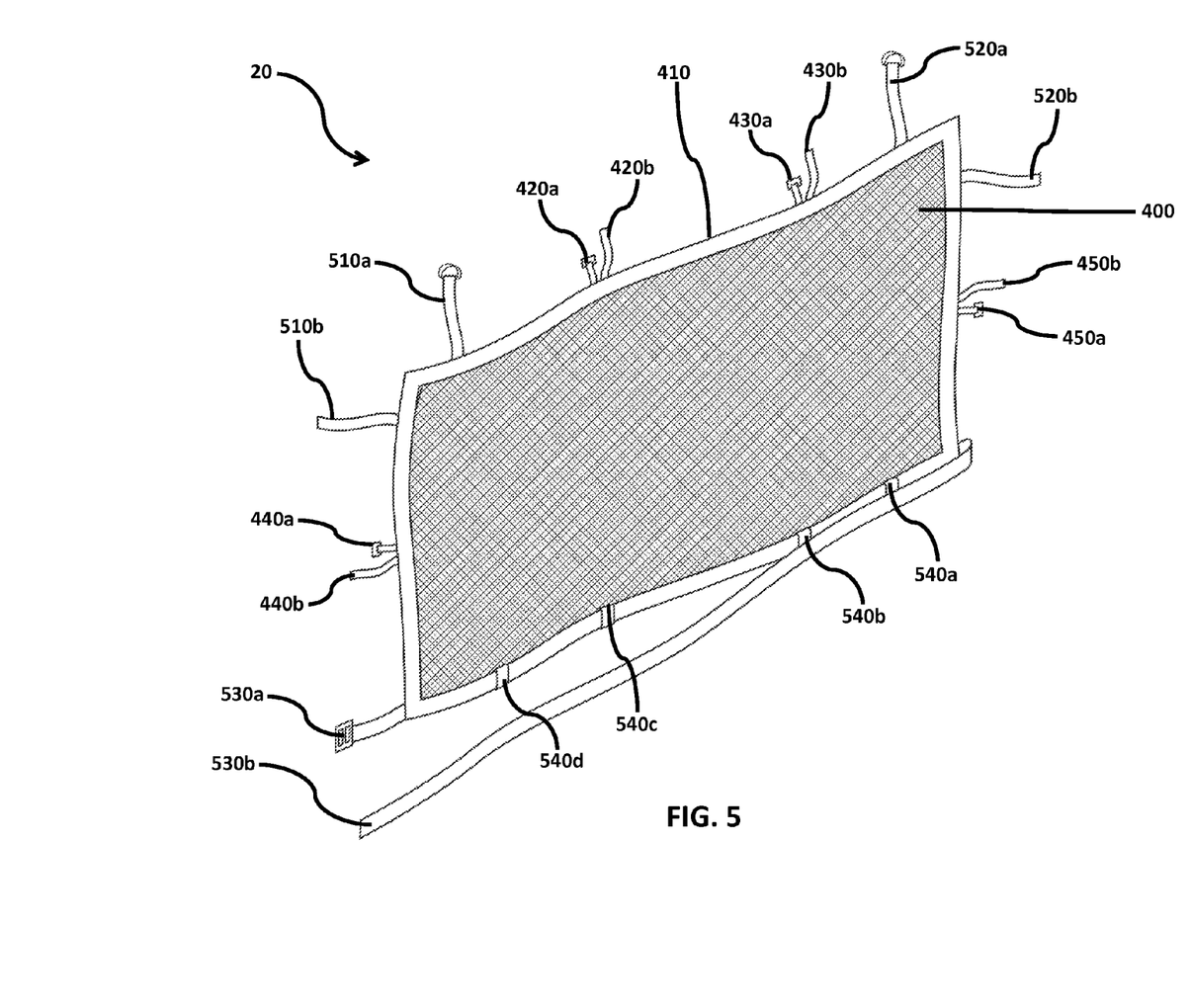
FIG. 5 illustrates an exploded perspective view of another embodiment of the windscreen of the present invention, illustrating its integrated straps and fasteners.
Figure 6:
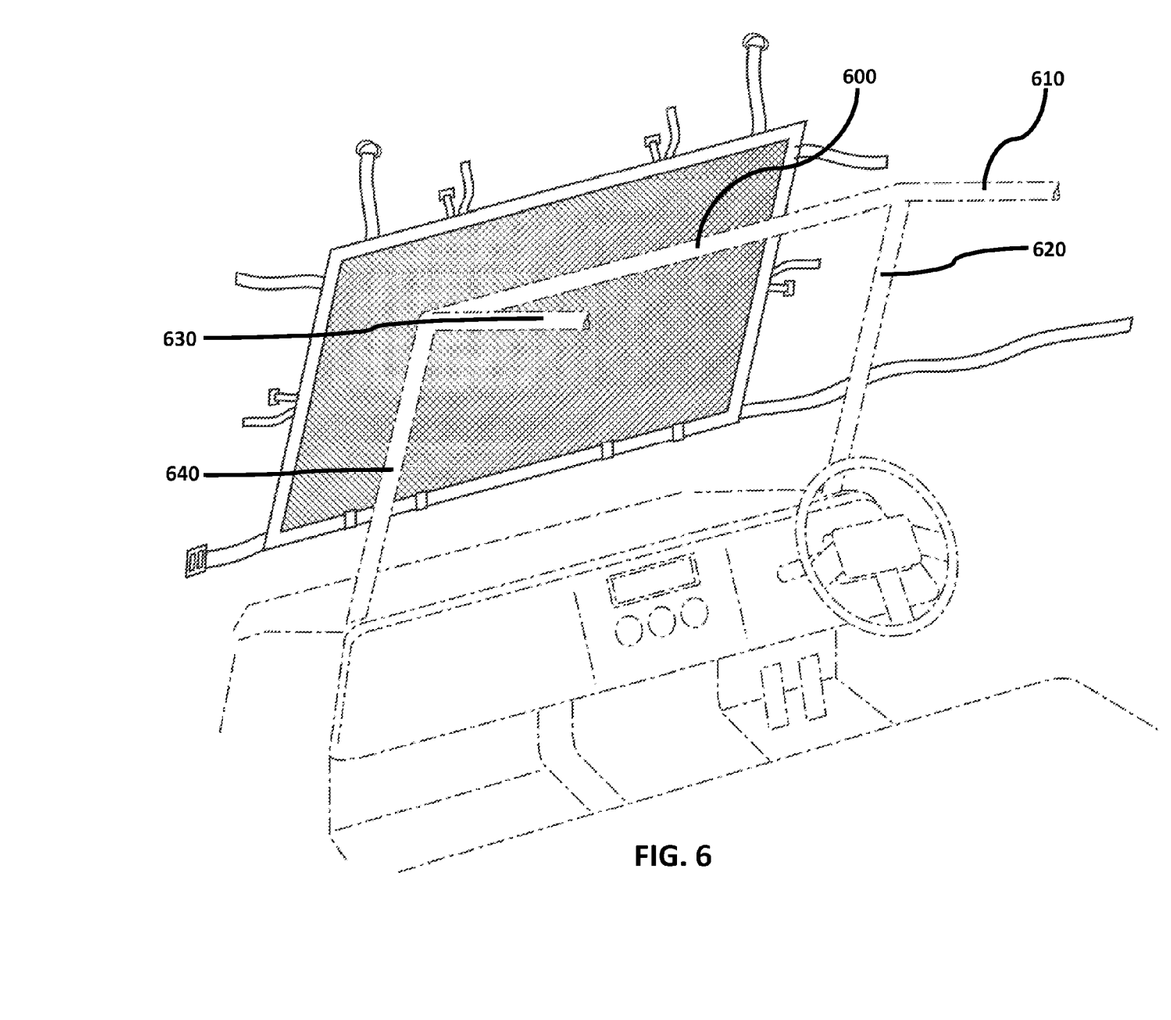
FIG. 6 illustrates a perspective view of the windscreen of FIG. 5 prior to being mounted to the roll cage of the UTV, as viewed from the cockpit area of the UTV.
Figure 7:
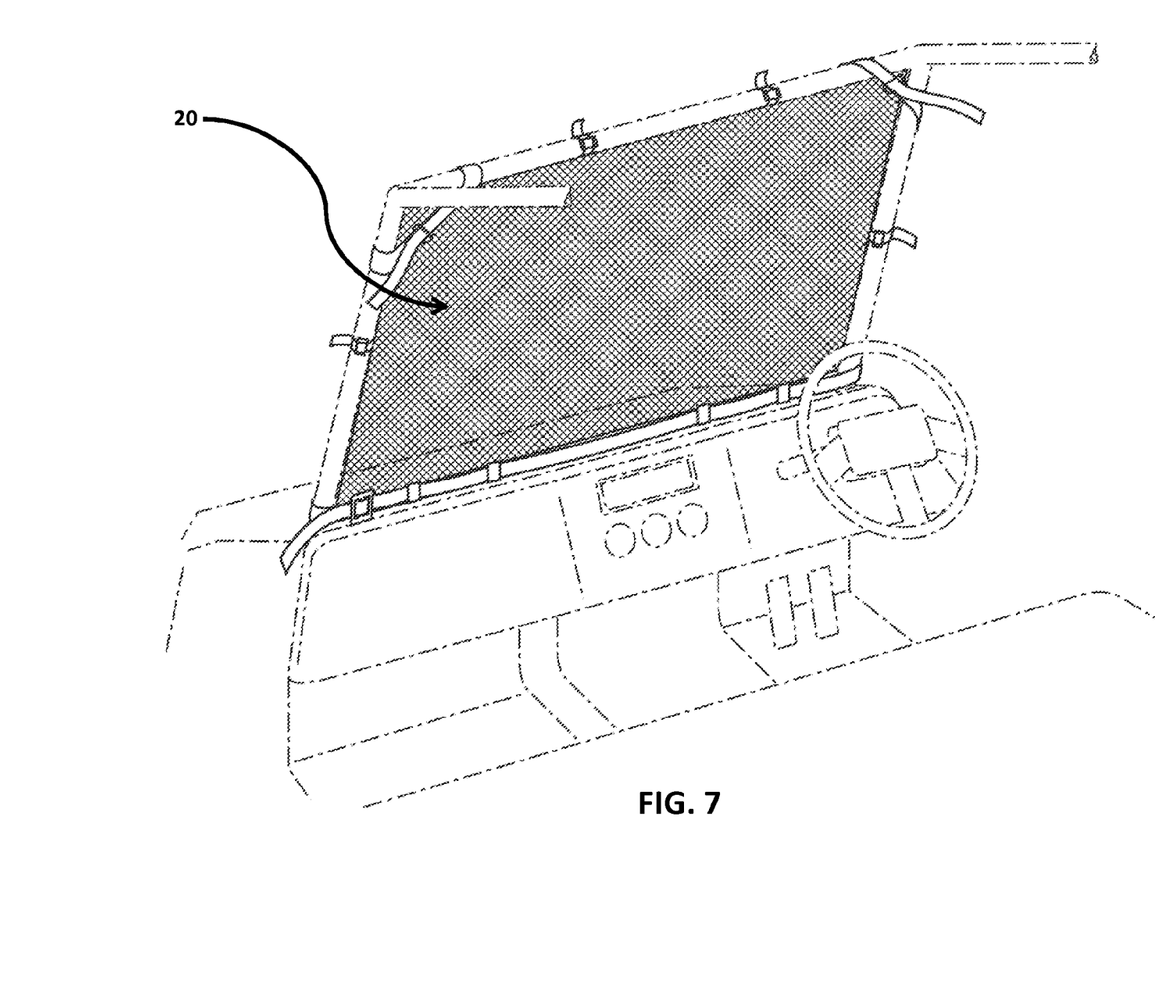
FIG. 7 illustrates a perspective view of the windscreen of FIG. 5 as mounted to the roll cage of the UTV, as viewed from the cockpit area of the UTV.

FIGS. 5-7 illustrate another embodiment for the windscreen of the present invention. Here, windscreen 20 has a plurality of straps securely attached to border or frame 410. In this embodiment, the straps are securely stitched to and integrated with the screen. However, it is contemplated within the scope of the invention that the straps may be detached (i.e. not initially integrated) and attached to the border using various securing methods, such as with snaps, buttons, adhesives, rivets, nut and bolt, nails, and/or staples. Here, straps 420*a*, 420*b*, 430*a*, and 430*b* engage and secure the windscreen to a top bar or overhead beam of the roll cage of a UTV or any suitable vehicle. Straps 510*a*, 510*b*, 520*a*, and 520*b* engage and secure the windscreen to the top corners of the roll cage of a UTV. Straps 440*a*, 440*b*, 530*a*, 530*b*, 450*a*, and 450*b* engage and secure the windscreen to the side upstanding bars or beams of the UTV. Specifically, the 420*a*, 430*a*, 440*a*, 450*a*, and 530*a* straps have a tri-glide or H type buckle connected at their ends thereto that engage straps 420*b*, 430*b*, 440*b*, 450*b*, and 530*b*, respectively. Further, straps 510*a* and 520*a* have "D" buckle type connectors attached at their ends thereto that engage straps 510*b* and 520*b*, respectively. However, it is contemplated within the scope of the invention that the connectors on straps 420*a*-530*a* can also be included on straps 420*b*-530*b* in addition to or in lieu of. Further, it is contemplated within the scope of the invention that any type of strap, connector, buckle, or strap connecter can be used for either one or more of straps 420*a*-530*a* and 420*b*-530*b*, including but not limited to a "D" buckle, side release buckle, clip buckle, snap buckle, tang buckle, hook and loop (Velcro®), clamp buckle, cam and spring buckles, carabiners, footman loops, spring pins, hooks, mini carabiner, ratchet buckles, and/or snap hooks. Further, either one or more of straps 420*a*-530*a* and/or their connectors and straps 420*b*-530*b* and/or their connectors can be made of any material, such as cotton, polyester, nylon, plastic, metal, aluminum, fiberglass, rubber, vinyl, and/or polymer based.

Still referring FIG. 5, windscreen 20 includes feed-through loops 540*a*, 540*b*, 540*c*, and 540*d* that receive long strap 530*b*. More specifically, strap 530*b* is at least partially wrapped around a side bar of the UTV and then fed through loops 540*a*-540*d*, where it then engages strap 530*a* and securely fastened and tightened to strap 530*a*, as shown in FIG. 7.

FIGS. 5-7 illustrate the method of attaching windscreen 20 to the UTV. In the current embodiment, the windscreen is attached from the exterior of the UTV, but in other embodiments, it can be attached from the interior or cabin of the UTV. Further, It is contemplated within the scope of the invention that a user is not limited to the following order and method of assembly. Here, straps 440*a* and 440*b* are at least partially wrapped around side bar 640 and are securely mated with and tightened to each other. Likewise, straps 450*a* and 450*b* are at least partially wrapped around side bar 620 and are securely tightened around the bar and mated with each other. Further, straps 420*a*, 420*b*, 430*a*, and 430*b* are at least partially wrapped around overhead or top bar 600. Here, strap 510*b* is at least partially wrapped around side bar 640 and strap 510*a* is at least partially wrapped around top bar 600 where it engages strap 510b and is securely mated with and tightened to strap 510a. Likewise, strap 520b is at least partially wrapped around side bar 620 and strap 520a is at least partially wrapped around top bar 600 where it engages strap 520b and is securely mated with and tightened to strap 520a. Lastly, long strap 530b is at least partially wrapped around side bar 620 and then fed through loops 540a, 540b, 540c, and 540d and where the end of strap 530b mates with and is tightened to the connector of strap 530a, wherein strap 530a is at least partially wrapped around side bar 640.

After the windscreen 20 has been attached to the roll cage or front windshield area of the UTV or any suitable vehicle, the user may then adjust any of the straps by either loosening or tightening the straps as they see fit in order to remove any slack, ripples, or deviations on the surface of the windscreen, thereby having a windscreen that is taught and securely mounted to the UTV. FIG. 7 illustrates the windscreen 20 of the current embodiment in final assembled form.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts or method of assembly described herein, except insofar as such limitations are included in the following claims. Further, it will be understood that certain features and sub-combinations are of utility and may be employed without reference to other features and sub-combinations.

What is claimed is:

1. A utility vehicle screen, comprising:
   a frame made of flexible material;
   a meshed flexible screen secured to the frame;
   wherein the frame has a plurality of securement devices for securing the frame to a roll cage of a utility vehicle;
   wherein one or more securement devices are secured to at least a front top bar of the roll cage and at least two side bars of the roll cage.

2. The utility vehicle screen of claim 1, wherein the meshed flexible screen is made of fiberglass.

3. The utility vehicle screen of claim 1, wherein the securement devices are comprised of straps.

4. The utility vehicle screen of claim 3, wherein the straps have one or more tri-glide fasteners.

5. The utility vehicle screen of claim 3, wherein a first strap at least partially engages the top bar and a second strap at least partially engages a first side bar, and wherein the first and second strap are secured to each other.

6. The utility vehicle of claim 5, wherein a third strap at least partially engages the top bar and a fourth strap at least partially engages a second side bar, and wherein the third and fourth strap are secured to each other.

7. The utility vehicle screen of claim 1, wherein at least two securement devices are attached to the front top bar of the roll cage, and at least two securement devices attached to each of the two side bars of the roll cage.

8. The utility vehicle screen of claim 3, wherein the frame includes a plurality of loops and wherein at least a first strap at least partially engages a first side bar, wherein the plurality of loops receive the first strap, and wherein the first strap is secured to a second strap.

9. The utility vehicle screen of claim 1, wherein the securement devices include one or more of: "D" buckles, side release buckles, clip buckles, snap buckles, tang buckles, hook and loop fasteners, clamp buckle, cam and spring buckles, carabiners, footman loops, spring pins, hooks, mini carabiners, ratchet buckles, and snap hooks.

10. A windscreen for a vehicle, comprising:
    a frame;
    a meshed flexible screen secured to the frame;
    wherein the frame has a plurality of fasteners for securing the frame to an A-pillar of the vehicle;
    wherein the fasteners are comprised of a plurality of straps; and wherein at least one strap extends from a first side of the frame for coupling with a second side of the frame.

11. The windscreen of claim 10, wherein the windscreen is adapted to be used with one or more of: utility vehicle (UTV), terrain vehicle (ATV), motorcycle, golf cart, and dune buggy.

12. The windscreen of claim 10, wherein the meshed flexible screen is made of fiberglass.

13. The windscreen of claim 12, wherein the fiberglass is virtually indestructible.

14. The windscreen of claim 10, wherein the windscreen is one universal size.

15. The windscreen of claim 10, wherein the plurality of straps further comprise six or more straps.

16. A windscreen for a vehicle, comprising:
    a plurality of fasteners for securing the windscreen to an A-pillar of the vehicle; and
    wherein at least one fastener extends from a first area of the windscreen for coupling with a second area of the windscreen.

17. The windscreen of claim 16, wherein the fastener is comprised of a strap.

* * * * *